United States Patent
Denton

(10) Patent No.: US 10,759,043 B2
(45) Date of Patent: Sep. 1, 2020

(54) WOOD-I FLOOR BEAM SQUARE

(71) Applicant: Randy Denton, Georgetown, TN (US)

(72) Inventor: Randy Denton, Georgetown, TN (US)

(*) Notice: Subject to any disclaimer, the term of this patent is extended or adjusted under 35 U.S.C. 154(b) by 210 days.

(21) Appl. No.: 16/143,636

(22) Filed: Sep. 27, 2018

(65) Prior Publication Data

US 2019/0118369 A1    Apr. 25, 2019

Related U.S. Application Data

(60) Provisional application No. 62/575,085, filed on Oct. 20, 2017.

(51) Int. Cl.
| | | |
|---|---|---|
| *G01B 5/24* | (2006.01) | |
| *B25H 7/04* | (2006.01) | |
| *G01B 5/00* | (2006.01) | |
| *G01B 3/00* | (2006.01) | |
| *G01B 3/56* | (2006.01) | |
| *E04C 3/14* | (2006.01) | |

(52) U.S. Cl.
CPC ............ *B25H 7/045* (2013.01); *G01B 3/002* (2013.01); *G01B 3/566* (2013.01); *G01B 5/0002* (2013.01); *E04C 3/14* (2013.01)

(58) Field of Classification Search
CPC .................................................. B25H 7/045
USPC ......................................... 33/32.1, 613, 645
See application file for complete search history.

(56) References Cited

U.S. PATENT DOCUMENTS

| | | |
|---|---|---|
| 826,759 A | 7/1906 | Branch |
| 1,048,333 A | 12/1912 | Mishler |
| 1,665,400 A | 4/1928 | Bittner |
| 2,026,274 A | 12/1935 | Martin |
| 2,213,148 A | 8/1940 | Pyle |
| 2,524,168 A * | 10/1950 | Harnish, Jr. ......... B23K 37/053 269/297 |
| 3,212,192 A | 10/1965 | Bachmann |
| 4,228,594 A | 10/1980 | Schlager |
| 5,295,308 A | 3/1994 | Stevens |
| 5,357,683 A | 10/1994 | Trevino |
| 5,396,710 A * | 3/1995 | Battaglia .................. B25H 7/02 33/429 |
| 5,446,969 A | 9/1995 | Terenzoni |
| 5,507,101 A * | 4/1996 | Mason ..................... B60S 5/00 33/288 |

(Continued)

FOREIGN PATENT DOCUMENTS

| | | |
|---|---|---|
| CN | 202450787 | 9/2012 |
| FR | 2964400 | 4/2012 |

(Continued)

*Primary Examiner* — George B Bennett

(74) *Attorney, Agent, or Firm* — Pitts & Lake, P.C.

(57) ABSTRACT

An adjustable square for wooden I-beams the adjustable square being adapted for marking cut lines on an I-beam having parallel flanges with a connected web disposed there between. The adjustable I-beam square includes first and second tongue members adapted for engaging an outer surface of the first and second flanges respectively. The adjustable square for wooden I-beams further includes an adjustable blade assembly. First and second saddle members bridge the respective flanges and adjoin the tongue members with the adjustable blade assembly. The adjustable blade assembly extends in a plane perpendicular to the first and second tongue members.

9 Claims, 8 Drawing Sheets

(56) References Cited

U.S. PATENT DOCUMENTS

| | | | |
|---|---|---|---|
| 5,727,325 A | 3/1998 | Mussell | |
| 5,822,942 A * | 10/1998 | Lucia, Jr. | E04B 2/7453 52/514 |
| 6,209,213 B1 | 4/2001 | Moe | |
| 6,272,758 B1 | 8/2001 | Wheeler | |
| 6,272,759 B1 * | 8/2001 | Reichenbach, Sr. | B61K 9/00 33/1 Q |
| 6,550,156 B1 * | 4/2003 | Scoville | F16L 55/18 33/371 |
| 6,575,042 B1 | 6/2003 | Rinner | |
| 6,629,372 B2 | 10/2003 | Doyle | |
| 6,895,683 B1 | 5/2005 | Olsen | |
| 6,964,112 B2 | 11/2005 | Caudle | |
| 7,299,560 B2 | 11/2007 | Diaz | |
| 7,555,843 B2 | 7/2009 | Leonard | |
| 7,571,551 B1 * | 8/2009 | Anderson | E04G 21/16 33/613 |
| 7,617,612 B2 * | 11/2009 | Brizendine | E04D 15/00 33/613 |
| 8,127,457 B2 | 3/2012 | Stoklosa | |
| 8,146,260 B1 | 4/2012 | Visser | |
| 8,240,054 B2 | 8/2012 | Peterson | |
| 8,272,136 B2 * | 9/2012 | Vogeler | B26B 29/06 30/286 |
| 8,661,699 B2 | 3/2014 | Vadala | |
| 2002/0095813 A1 * | 7/2002 | Tatarnic | G01C 9/28 33/613 |
| 2002/0144421 A1 * | 10/2002 | Hanson | E04F 21/0092 33/613 |
| 2002/0170189 A1 * | 11/2002 | Cheatham | E04F 21/0015 33/194 |
| 2003/0033724 A1 | 2/2003 | Barbosa | |
| 2003/0159301 A1 | 8/2003 | Lawson | |
| 2004/0139622 A1 | 7/2004 | Vlk | |
| 2005/0072013 A1 | 4/2005 | Caudle | |
| 2005/0144797 A1 | 7/2005 | Caudle | |
| 2006/0101661 A1 * | 5/2006 | Schmidt | A47G 1/205 33/613 |
| 2006/0123644 A1 * | 6/2006 | Szumer | G01C 9/28 33/374 |
| 2010/0005672 A1 | 1/2010 | Cerwin | |
| 2010/0229415 A1 * | 9/2010 | Knudsen | E04H 12/2284 33/613 |
| 2011/0010956 A1 | 1/2011 | Hoshi | |
| 2011/0173829 A1 | 7/2011 | Pettersson | |
| 2012/0234150 A1 | 9/2012 | Holtgreive | |
| 2013/0111772 A1 | 5/2013 | Vadala | |
| 2013/0219732 A1 * | 8/2013 | Jordan | E04G 21/1891 33/613 |
| 2015/0197005 A1 | 7/2015 | Stoklosa | |
| 2018/0333840 A1 * | 11/2018 | Chahine | B62B 3/008 |

FOREIGN PATENT DOCUMENTS

| | | |
|---|---|---|
| GB | 2483296 | 3/2012 |
| JP | 2007256130 | 10/2007 |
| JP | 2012021350 | 2/2010 |
| JP | 2012021349 | 2/2012 |
| JP | 3194600 | 11/2014 |
| JP | 2015067947 | 4/2015 |

* cited by examiner

WOOD-I FLOOR BEAM SQUARE

CROSS-REFERENCE TO RELATED APPLICATIONS

This application claims the benefit of U.S. Provisional Patent Application No. 62/575,085, filed on Oct. 20, 2017, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to a device for making perpendicular markings on an I-beam. More particularly, it relates to a wood I-beam square for making perpendicular markings on floor joist I-beams and other related I-beams used in home construction in which the I-beam square is adjustable to accommodate I-beams of different heights.

2. Description of the Related Art

In the field of carpentry, especially as related to home construction, it is known to use squares to mark perpendicular cuts on the various boards and panels, such as sawn lumber boards, sheets of dry wall, or sub-flooring, utilized in this technical field. It is known that there are L-shaped squares commonly used for this purpose and that there are triangular shaped squares, sometimes referred to as a layout tool. While these tools are very well suited for marking straight boards of various dimensions, it will be recognized that it has become more common to utilize engineered lumber wooden I-beams as floor or roofing joists. In this regard, engineered wood lumber I-beams have top and bottom flanges, commonly having widths of 1½" to 3½" that are typically sawn lumber; and also have a web made from either plywood or oriented strand board. The web commonly has depths of 9½", 11⅞", 14", and 16". Engineered lumber wooden I-beams are commonly used for floor joists and roof framing. Those skilled in the art recognize that the common squares described above, are inefficient for marking dimensions or cut lines on the web of a wooden I-beam on account of interference from the flanges of the wooden I-beam. And various inventors have made certain contributions to the art of marking I-beams. For instance, in U.S. Pat. No. 6,964,112, issued to Caudle on Nov. 15, 2005, a device for measuring and marking lines and points on a steel I-beam which includes a rib for contacting the outside of an I-beam flange, a measuring blade that rests on the beam web, and a bridge for connecting the blade and the rib is disclosed. Further, in U.S. Pat. No. 6,629,372, issued to Doyle on Oct. 7, 2003, a modified square having primary and secondary "L" forms in which that all blades and tongues lie in a common plane such that the modified square has utility for extending around the flange of an I-beam is disclosed. However, those skilled in the art will recognize that engineered lumber wood I-beams come in a variety of depths.

Despite these advancements in the art, what is nevertheless still missing from the art is an adjustable I-beam square that is adapted such that the blade is adjustable in order to compensate for engineered lumber wooden I-beams having different widths.

BRIEF SUMMARY OF THE INVENTION

The adjustable I-beam square of the present invention is adapted for marking cut lines on an I-beam having parallel flanges with a connected web disposed there between. The adjustable I-beam square includes a first tongue member which is adapted for engaging an outer surface of a first flange of the I-beam. A first saddle adjoins first tongue member and bridges the first flange. Similarly, adjustable I-beam square further includes a second tongue member which is adapted for engaging an outer surface of a second flange of the I-beam. A second saddle adjoins second tongue member and bridges the second flange. In order to allow adjustable I-beam square to be useful for marking webs of different depths, I-beam square further includes an adjustable blade assembly extending in a plane perpendicular to the first and second tongue members. In this regard, the adjustable blade assembly has a first end removably secured to the first saddle member and a second end removably secured to the second saddle member and further has an adjustable length. Further, as will be appreciated by those skilled in the art, adjustable blade assembly is adapted for marking a cut line perpendicular to the I-beam along the web of the I-beam. In this regard, adjustable blade assembly is removably received by saddle retainer blocks. In this regard, first saddle member is provided with top and bottom first retainer blocks. Similarly, second saddle member is provided with top and bottom first retainer blocks. In a further exemplary embodiment, the first tongue member, the first saddle member, and a portion of the adjustable blade assembly are integrally formed; and the second tongue member, the second saddle member, and a second portion of the adjustable blade assembly are integrally formed.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1A:
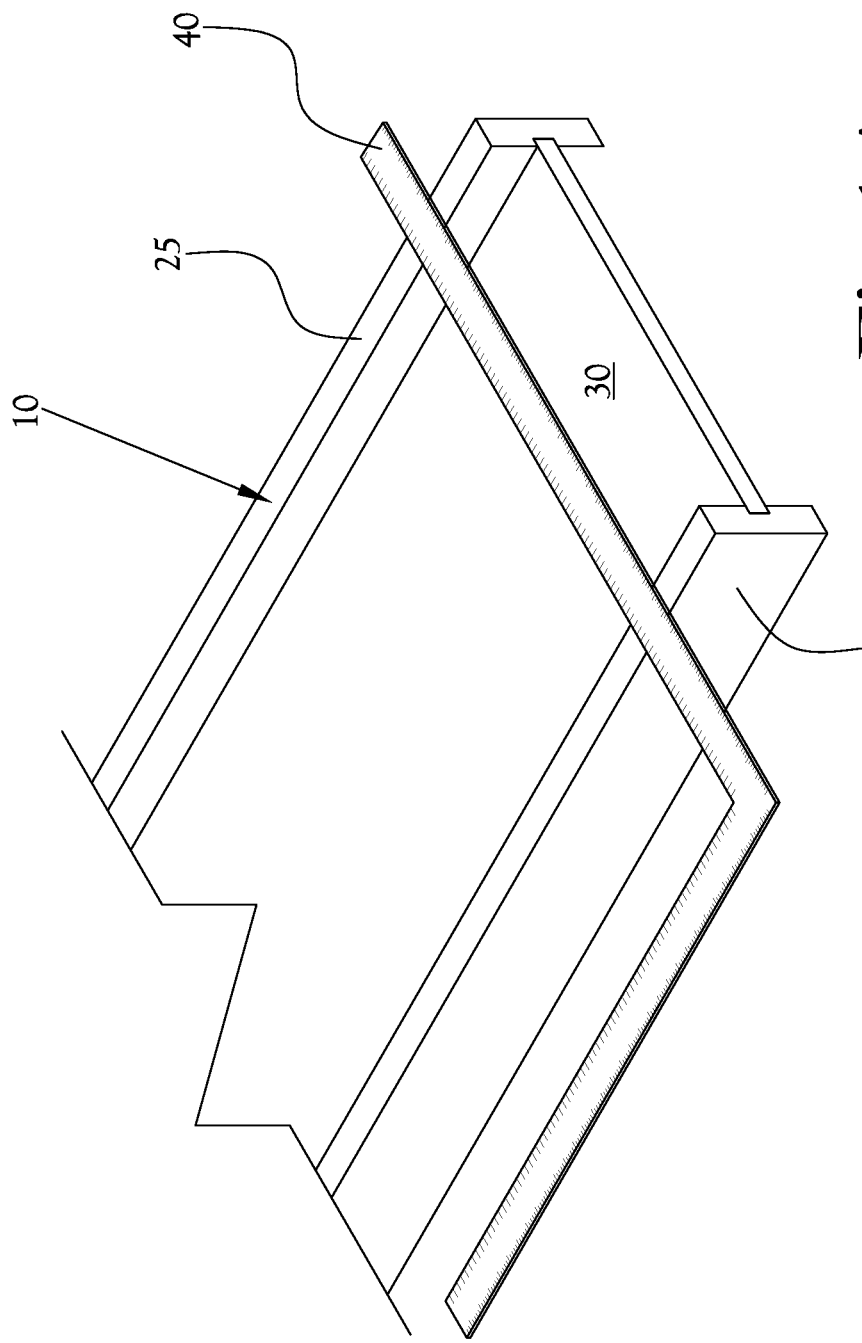
FIGS. 1A and 1B are photographic views of one prior art method of marking a perpendicular cut line on a wood I-beam illustrating the problem intended to be solved by the present invention.
Figure 1B:
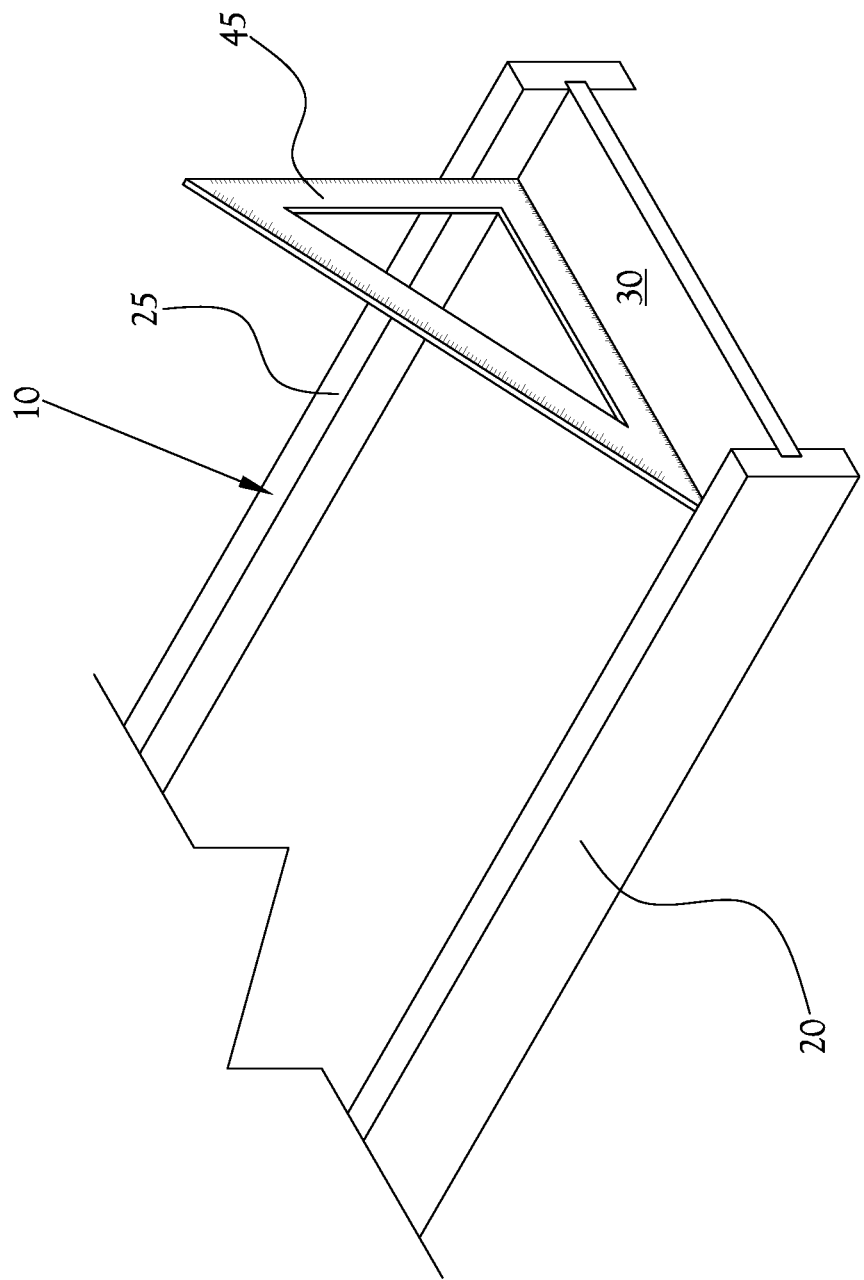
Figure 2:
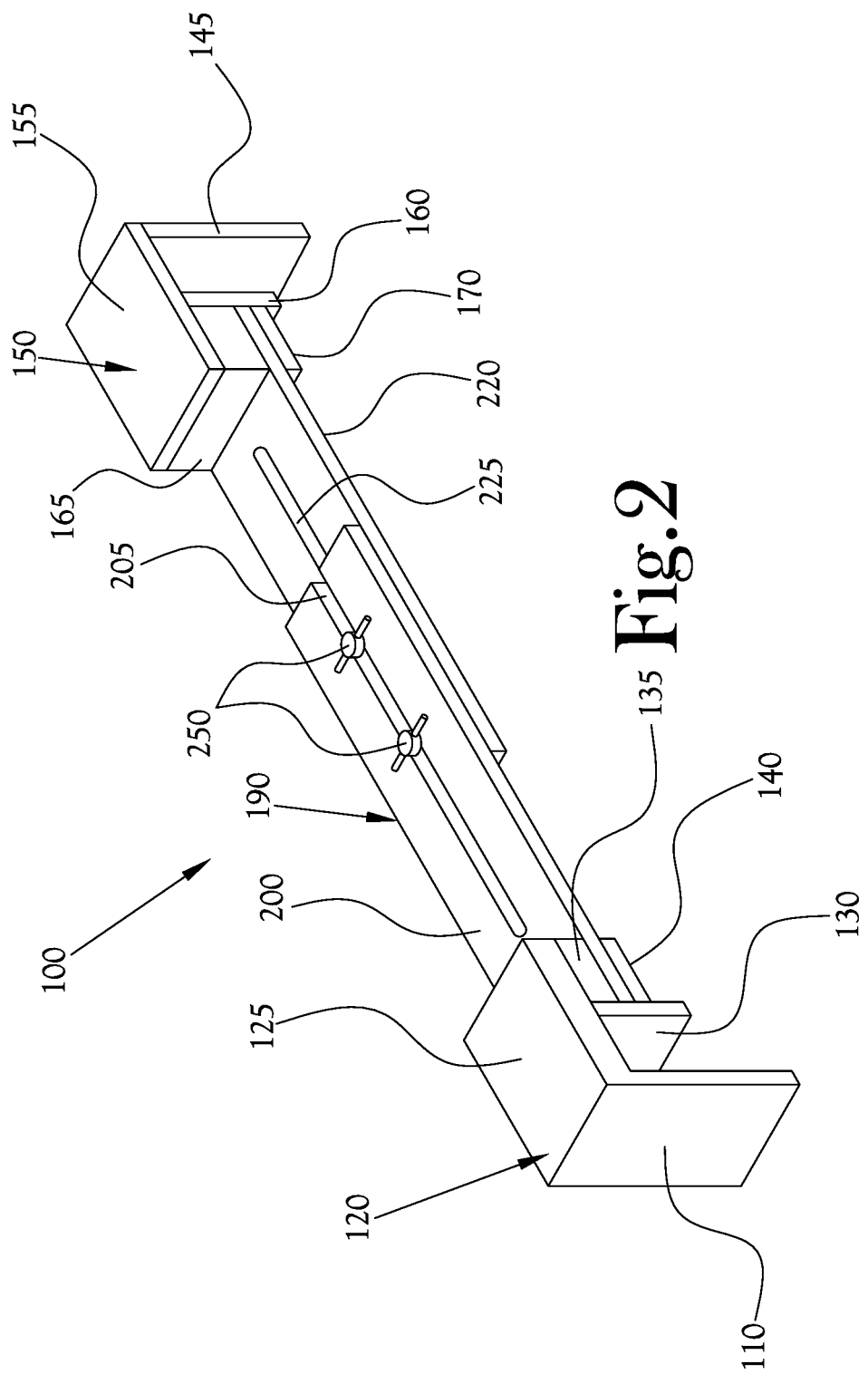
FIG. 2 is a perspective view an exemplary embodiment of the adjustable I-beam square of the present invention.
Figure 3:
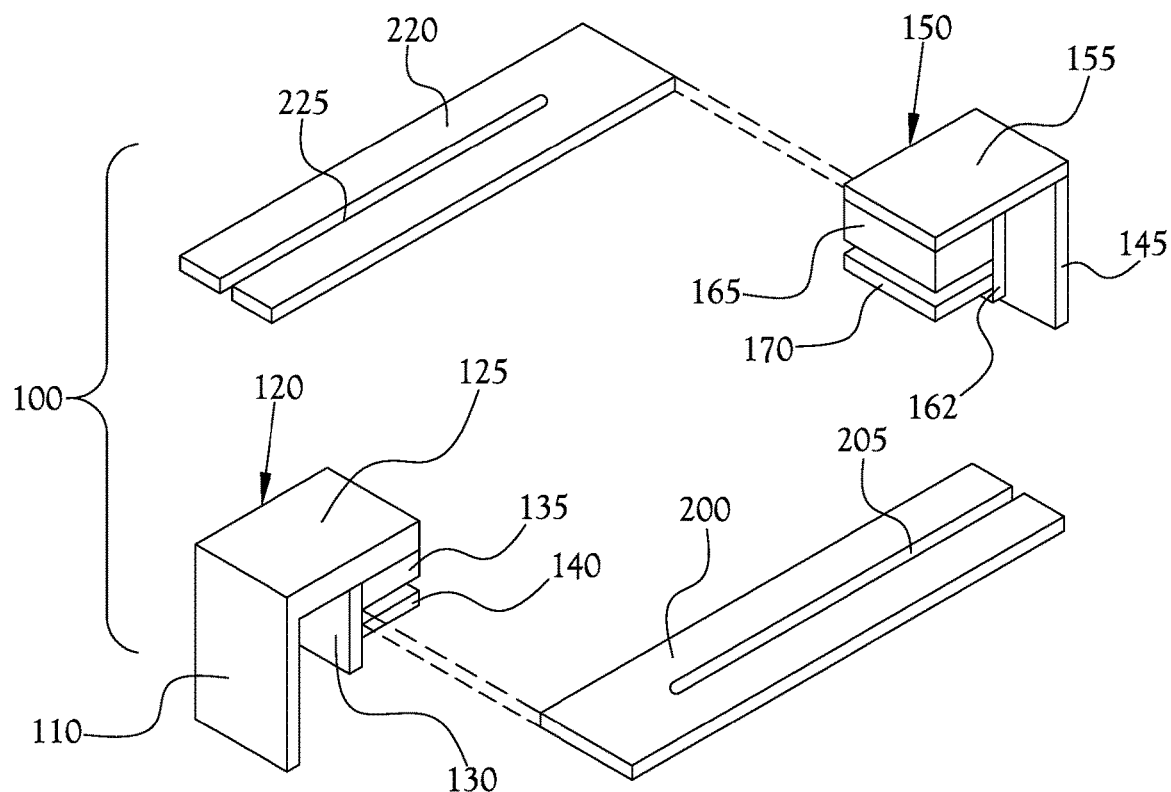
FIG. 3 is an exploded view of the adjustable I-beam square illustrated in FIG. 2.
Figure 4:
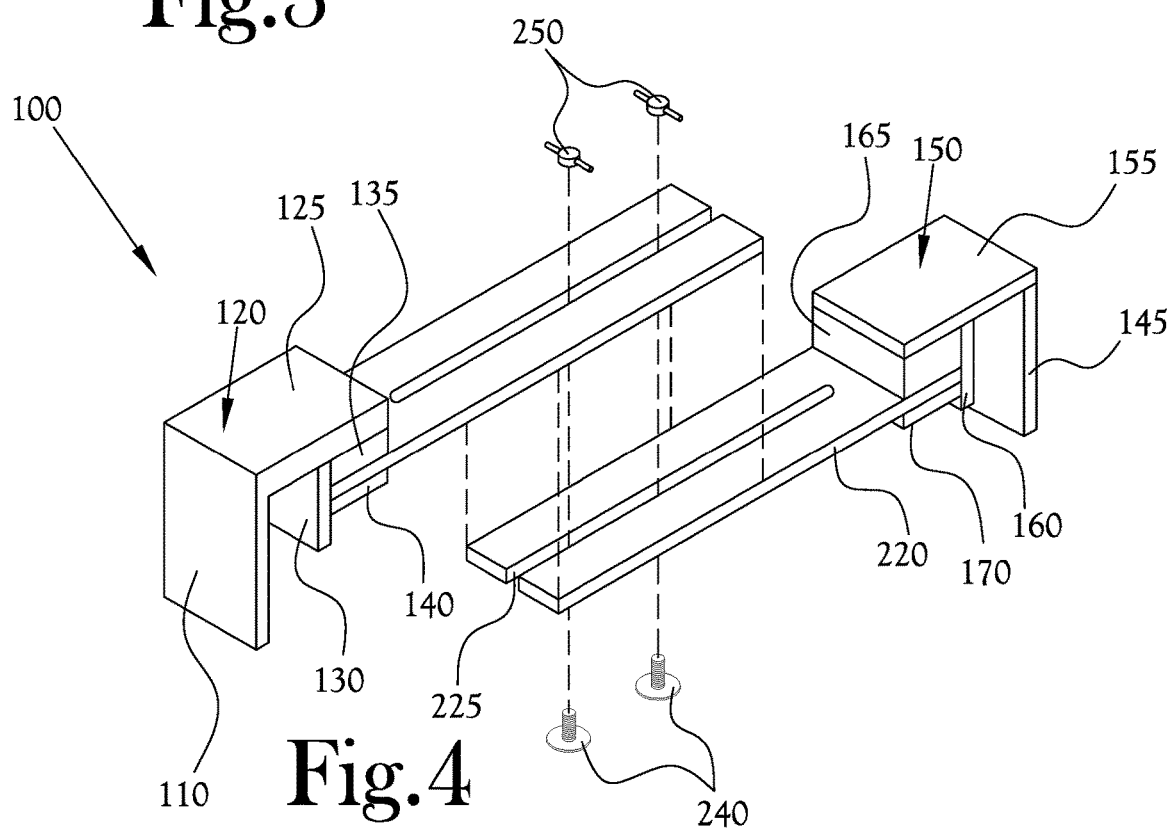
FIG. 4 is a further exploded view of the adjustable I-beam square illustrated in FIG. 2.
Figure 5:
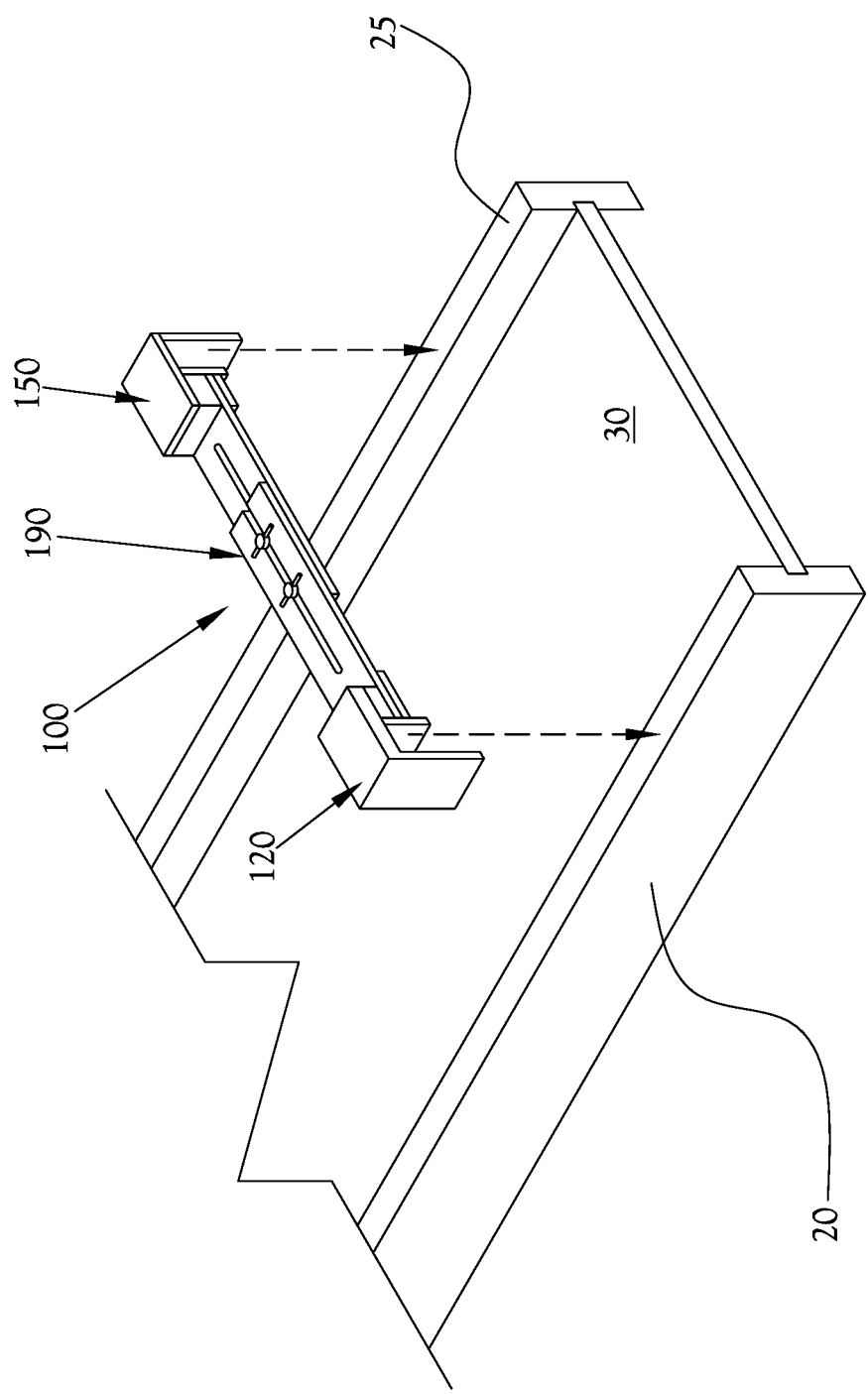
FIG. 5 is a perspective view of the adjustable I-beam square illustrated in FIG. 2 being installed on an exemplary wood I-beam.
Figure 6:
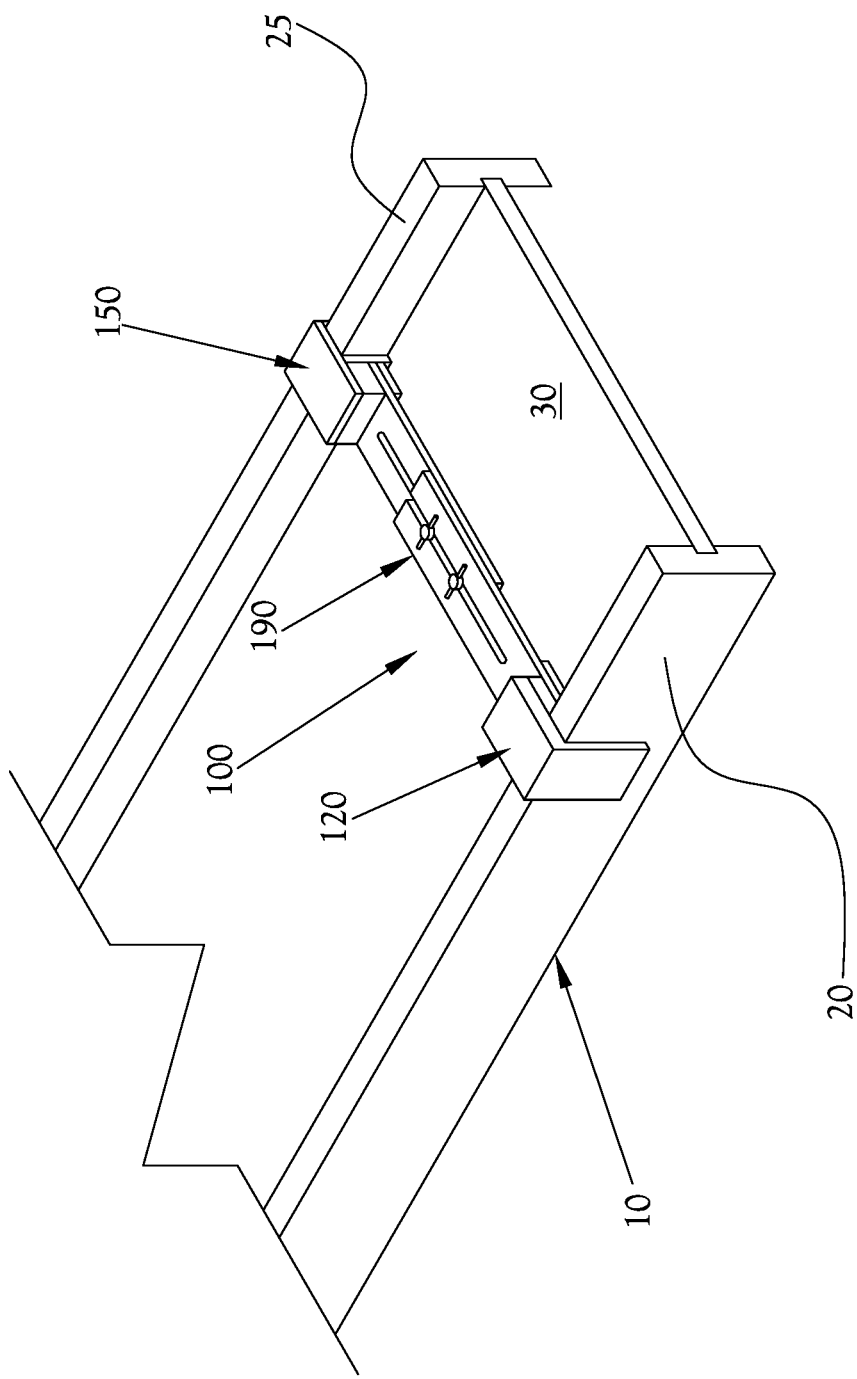
FIG. 6 is a perspective view of the adjustable I-beam square illustrated in FIG. 2 and FIG. 5 installed on an exemplary wood I-beam.

FIGS. 1A and 1B illustrate the problem that the present invention is intended to address and overcome. With reference to the drawings, it will be appreciated by those skilled in the art that an engineered lumber wooden I-beam 10 includes a pair of flanges defining a first flange 20 and a second flange 25 having a web 30 disposed there between. As stated above, the top and bottom flanges 20 commonly have widths of approximately 1½" to approximately 3½" that are typically sawn lumber. Disposed between the flanges 20 and 25, the web 30 is typically made from either plywood or oriented strand board, ("OSB"). The web 30 commonly has depths of 9½", 11⅞", 14", and 16". As will be appreciated by those skilled in this art, in order to mark a perpendicular cut-line across the flanges 20 and 25 and the web 30, a mark might be made across the flanges 20 with the use of a framing square 40. Then, a tool such as a quick square layout tool 45, is utilized to mark the perpendicular cut line across the surface of web 30. As will be appreciated by those skilled in the art, this requires multiple tools and is inefficient.

Referring to FIGS. 2-6, an exemplary embodiment of the adjustable I-beam square 100 of the present invention is illustrated. Adjustable I-beam square 100, in an exemplary embodiment, is adapted for marking cut lines on an I-beam. Adjustable I-beam square 100 includes a first tongue member 110 which is adapted for engaging an outer surface of a first flange 20 of the I-beam 10. A first saddle 120 adjoins first tongue member 110. First saddle member 120, in an exemplary embodiment includes a horizontal portion 125 and a vertical portion 130. Similarly, adjustable I-beam square 100 further includes a second tongue member 145 which is adapted for engaging an outer surface of second flange 25 of the I-beam 10. A second saddle 150 adjoins second tongue member 145. Second saddle member 150, in an exemplary embodiment includes a horizontal portion 155 and a vertical portion 160.

In order to allow adjustable I-beam square 100 to be useful for marking webs of different depths, I-beam square 100 further includes an adjustable blade assembly 190 extending in a plane perpendicular to the first and second tongue members 110 and 145 respectively. In this regard, the adjustable blade assembly 190 has a first end removably secured to the first saddle member 120 and a second end removably secured to the second saddle member 150. Further, as will be appreciated by those skilled in the art, adjustable blade assembly 190 is adapted for marking a cut line perpendicular to the I-beam 10 along the web 30 of the I-beam 10. In this regard, adjustable blade assembly 190 is removably received by saddle retainer blocks and is secured thereto, in an exemplary embodiment with set screws. In this regard, first saddle member 120 is provided with top and bottom first retainer blocks 135 and 140, respectively. In a further exemplary embodiment, adjustable blade assembly 190 could be removably received by the saddle retainer blocks by a tight frictional fit. Similarly, second saddle member 150 is provided with top and bottom first retainer blocks 165 and 17, respectively.

It should be recognized that the first saddle member 120 is provided for connecting the first tongue member 110 and the adjustable blade assembly 190; and further, the first saddle member 120 is adapted for bridging the first flange 20 of the wooden I-beam 10. Similarly, the second saddle member 150 is provided for connecting the second tongue member 145 and the adjustable blade assembly 190; and, the second saddle member 150 is adapted for bridging the second flange 25 of the wooden I-beam 10.

In an exemplary embodiment, the adjustable blade assembly 190 includes a first blade member 200 adapted to depend from first saddle member 120 and extending from first saddle member 120. First blade member 200 includes a longitudinal slot 205 extending there through. The adjustable blade assembly 190 further includes a second blade member 220 adapted to depend from second saddle member 150 and extends from second saddle member 150. The second blade member 220 engages first blade member 200 such that the longitudinal slots 205 and 225 align and register with one another. In an exemplary embodiment, at least a pair of threaded bolts 240 are provided which extend through aligned slots 205 and 225 and are tightened with at least a pair of cooperating threaded nuts 250 in order to secure adjustable blade assembly 190 at a selected length. It will be appreciated that while threaded nuts 250 are illustrated as simple hex nuts, wing nuts or threaded knobs, for ease of hand tightening and loosening could also be used. In an exemplary embodiment, first and second blade members 200 and are approximately 11⅛" long. Further, in an exemplary embodiment, longitudinal slots 205 and 225 have a width in a range of approximately 5/16" to approximately ⅜".

Figure 7:
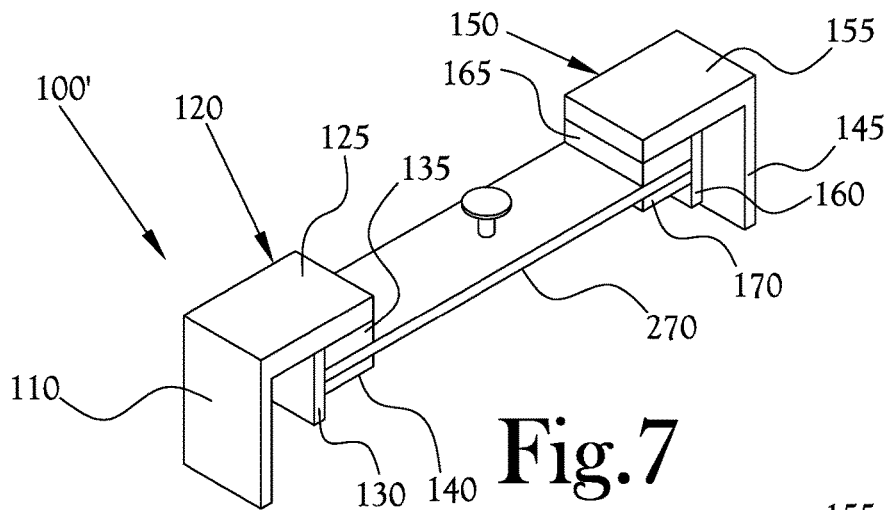
FIG. 7 is a perspective view of a further exemplary embodiment of an adjustable I-beam square of the present invention.
Figure 8A:
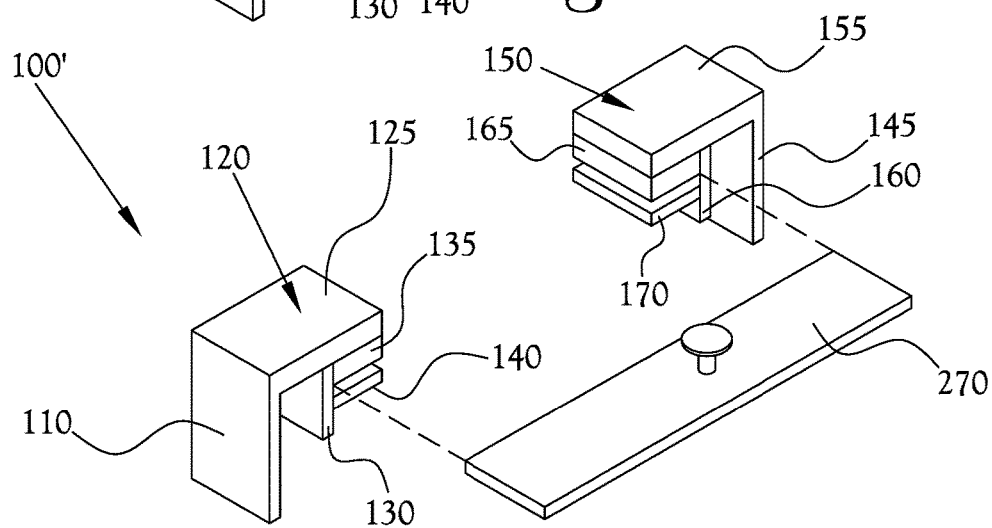
FIGS. 8A and 8B are perspective views of the further exemplary embodiment of the adjustable I-beam square illustrated in FIG. 7.
Figure 8B:
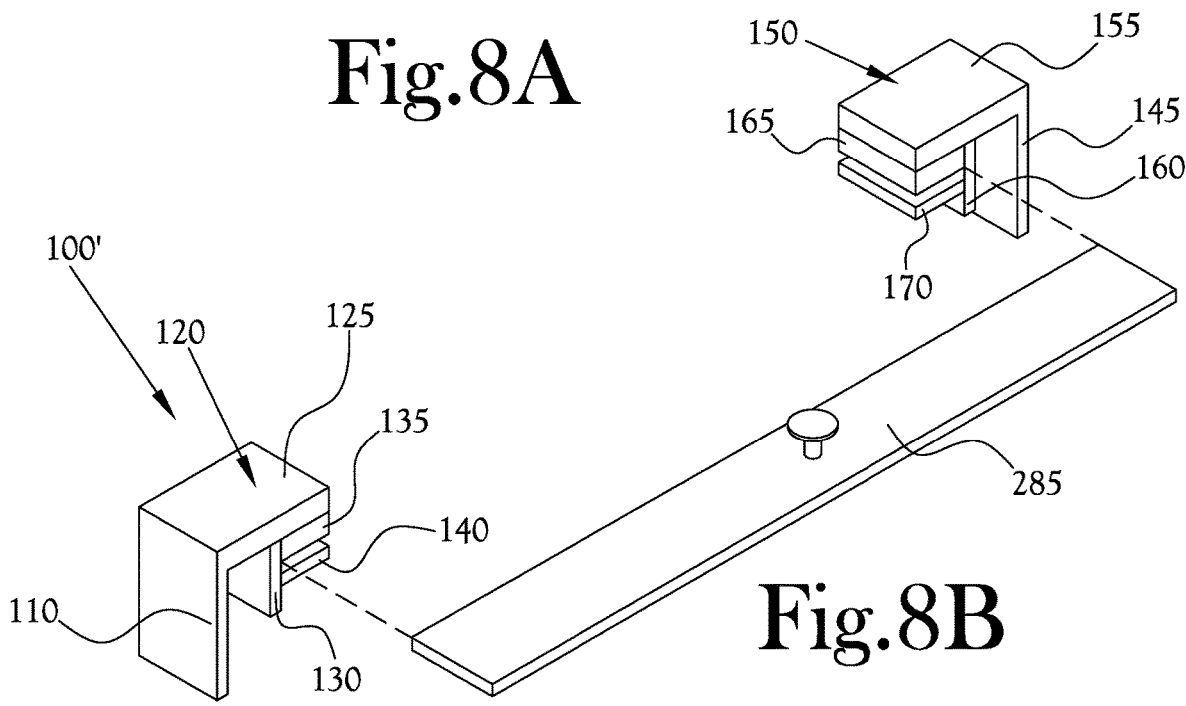

In a further exemplary embodiment of adjustable I-beam square 100' the adjustable blade assembly 190' includes a plurality of blade members of differing selected lengths. In this regard, referring to FIGS. 7, 8A, and 8B, the adjustable I-beam square 100' includes at least a first blade member 270 of a first selected length that is adapted to extend from first saddle member 120 to second saddle member 150 and, as described above, is further adapted to be removably secured to first and second saddle members 120 and 150, respectively. Further, adjustable I-beam square 100' includes at least a second blade member 285 of a second selected length that is adapted to extend from first saddle member 120 to second saddle member 150 and is also adapted to be removably secured to first and second saddle members 120 and 150, respectively. By providing at least two blade members 270 and 285 that are interchangeable, the width of adjustable blade assembly 190' is adjustable.

Figure 9:
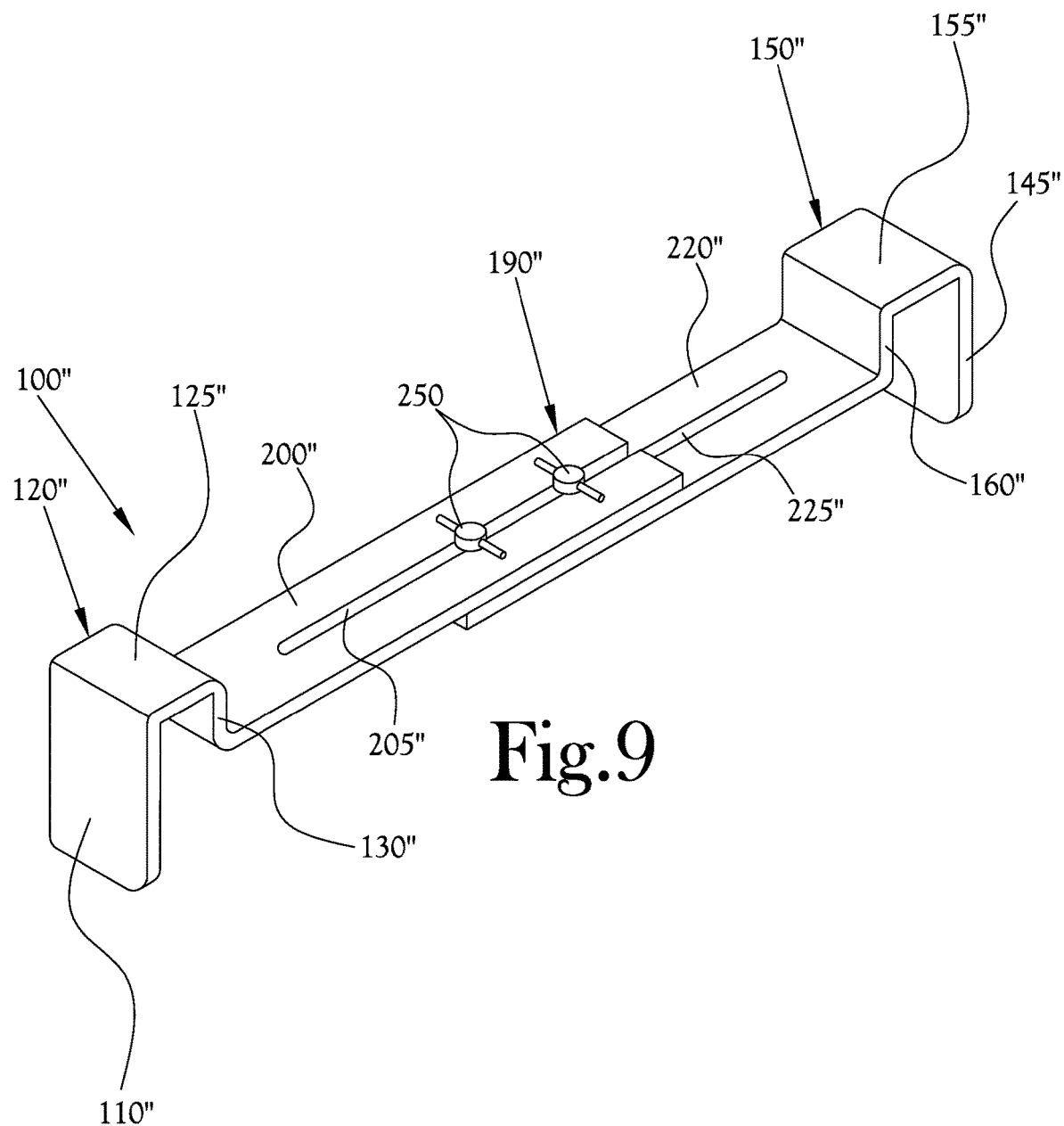
FIG. 9 is a perspective view of yet another exemplary embodiment of the adjustable I-beam square of the present invention.

In a further exemplary embodiment, illustrated in FIG. 9, adjustable I-beam square 100" incorporates an integral construction. In this regard, a first tongue member 110", first saddle 120", including horizontal portion 125" and a vertical portion 130", along with blade 200" are integrally formed. Similarly, a second tongue member 145", second saddle 150", including horizontal portion 155" and a vertical portion 160", along with blade 220" are integrally formed. As described above, slots 205" and 225" are provided in blade members 200" and 220" respectively.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An adjustable square for wooden I-beams adapted for marking cut lines on the wooden I-beam, said adjustable square comprising:
   a first tongue member for engaging an outer surface of a first flange of the I-beam;
   a second tongue member for engaging an outer surface of a second flange of the I-beam;
   an adjustable blade assembly extending in a plane perpendicular to said first and second tongue members and adapted for marking a cut line perpendicular to the I-beam along a web of the I-beam;
   a first saddle member for connecting said first tongue member and said adjustable blade assembly, wherein said first saddle member is adapted for bridging the first flange of the I-beam;
   a second saddle member for connecting said second tongue member and said adjustable blade assembly, wherein said second saddle member is adapted for bridging the second flange of the I-beam.

2. The adjustable square of claim 1 wherein said adjustable blade assembly includes a first blade member adapted to depend from said first saddle member and extending from said first saddle member, said first blade member including a longitudinal slot extending there through and wherein said adjustable blade assembly further includes a second blade member adapted to depend from said second saddle member and extending from said second saddle member and engaging said first blade member, wherein at least a pair of bolts extending through said second blade member register with and extend through said longitudinal slot.

3. The adjustable square of claim 1 wherein said adjustable blade assembly includes a first blade member of a first selected length adapted to extend from said first saddle member to said second saddle member and further adapted to be removably secured to said first and said second saddle members and at least a second blade member of a second selected length adapted to extend from said first saddle member to said second saddle member and further adapted to be removably secured to said first and said second saddle members, wherein said first and second blade members are interchangeable thereby adjusting a width of said adjustable blade assembly.

4. An adjustable square for wooden I-beams adapted for marking cut lines on the wooden I-beam, said adjustable square comprising:
   a first tongue member for engaging an outer surface of a first flange of the I-beam;
   a second tongue member for engaging an outer surface of a second flange of the I-beam;
   an adjustable blade assembly extending in a plane perpendicular to said first and second tongue members and adapted for marking a cut line perpendicular to the I-beam along a web of the I-beam, wherein said adjustable blade assembly includes a first blade member adapted to depend from said first saddle member and extending from said first saddle member, said first blade member including a longitudinal slot extending there through;
   a first saddle member for connecting said first tongue member and said adjustable blade assembly, wherein said first saddle member is adapted for bridging the first flange of the I-beam;
   a second saddle member for connecting said second tongue member and said adjustable blade assembly, wherein said second saddle member is adapted for bridging the second flange of the I-beam.

5. The adjustable square of claim 4 wherein said adjustable blade assembly further includes a second blade member adapted to depend from said second saddle member and extending from said second saddle member and engaging said first blade member, wherein at least a pair of bolts extending through said second blade member register with and extend through said longitudinal slot.

6. The adjustable square of claim 5 wherein said adjustable blade assembly includes a first blade member of a first selected length adapted to extend from said first saddle member to said second saddle member and further adapted to be removably secured to said first and said second saddle members and at least a second blade member of a second selected length adapted to extend from said first saddle member to said second saddle member and further adapted to be removably secured to said first and said second saddle members, wherein said first and second blade members are interchangeable thereby adjusting a width of said adjustable blade assembly.

7. An adjustable square for wooden I-beams adapted for marking cut lines on the wooden I-beam, said adjustable square comprising:
   a first tongue member for engaging an outer surface of a first flange of the I-beam;
   a second tongue member for engaging an outer surface of a second flange of the I-beam;
   an adjustable blade assembly extending in a plane perpendicular to said first and second tongue members and adapted for marking a cut line perpendicular to the I-beam along a web of the I-beam, wherein said adjustable blade assembly includes a first blade member adapted to depend from said first saddle member and extending from said first saddle member, said first blade member including a longitudinal slot extending there through and wherein said adjustable blade assembly further includes a second blade member adapted to depend from said second saddle member and extending from said second saddle member and engaging said first blade member;
   a first saddle member for connecting said first tongue member and said adjustable blade assembly, wherein said first saddle member is adapted for bridging the first flange of the I-beam;
   a second saddle member for connecting said second tongue member and said adjustable blade assembly, wherein said second saddle member is adapted for bridging the second flange of the I-beam.

8. The adjustable square of claim 7 wherein at least a pair of bolts extending through said second blade member register with and extend through said longitudinal slot.

9. The adjustable square of claim 8 wherein said adjustable blade assembly includes a first blade member of a first selected length adapted to extend from said first saddle member to said second saddle member and further adapted to be removably secured to said first and said second saddle members and at least a second blade member of a second selected length adapted to extend from said first saddle member to said second saddle member and further adapted to be removably secured to said first and said second saddle members, wherein said first and second blade members are interchangeable thereby adjusting a width of said adjustable blade assembly.

* * * * *